United States Patent [19]

Song et al.

[11] Patent Number: 5,534,215

[45] Date of Patent: Jul. 9, 1996

[54] PROCESS FOR THE PREPARATION OF BIAXIALLY ORIENTED POLYESTER FILM

[75] Inventors: Il-Cheon Song, Kunpo; Sang-Il Kim, Suwon; Young-Jin Lee, Anyang, all of Rep. of Korea

[73] Assignee: SKC Limited, Suwon, Rep. of Korea

[21] Appl. No.: 539,283

[22] Filed: Oct. 4, 1995

[30] Foreign Application Priority Data

Oct. 6, 1994 [KR] Rep. of Korea ................. 94-25497

[51] Int. Cl.$^6$ ........................................ B29C 71/02
[52] U.S. Cl. ............ 264/345; 264/177.17; 264/177.19; 264/210.7; 264/211.12; 264/235.8; 264/342 RE; 264/346
[58] Field of Search ............... 264/210.7, 211.12, 264/177.17, 177.19, 235.8, 342 RE, 345, 346

[56] References Cited

U.S. PATENT DOCUMENTS

| | | | |
|---|---|---|---|
| 3,875,119 | 4/1975 | Aoki et al. | 264/235.8 |
| 4,020,141 | 4/1977 | Quinn et al. | 264/289 |
| 4,226,826 | 10/1980 | Motegi et al. | 264/235.8 |
| 4,234,532 | 11/1980 | Motegi et al. | 264/235.8 |
| 4,237,088 | 12/1980 | Yoshimura et al. | 264/235.8 |
| 4,293,508 | 10/1981 | Heirbaut et al. | 264/25 |
| 4,977,020 | 12/1990 | Utsumi | 428/323 |
| 5,051,292 | 9/1991 | Katoh et al. | 428/141 |
| 5,093,064 | 3/1992 | Utsumi et al. | 264/210.7 |
| 5,431,983 | 7/1995 | Etchu et al. | 428/141 |
| 5,474,844 | 12/1995 | Sato et al. | 428/332 |

*Primary Examiner*—Samuel A. Acquah
*Attorney, Agent, or Firm*—Anderson Kill Olick & Oshinsky

[57] ABSTRACT

A biaxially oriented polyester film with excellent levelling property is produced by the inventive process which comprises: (a) melt-extruding and extending biaxially a polyester resin to shape it into a film; (b) treating the film thermally under a condition that formulae (1), (2) and (3) are satisfied; and (c) relaxing the film at a temperature range of Tm-60° C. to Tm-140° C. during the step (b):

$$Tm\text{-}60°\ C. < T1 < Tm\text{-}10°\ C. \quad (1)$$

$$50 < T1 - T2 < 100 \quad (2)$$

$$5 < (T1 - T2)/t < 25 \quad (3)$$

wherein:

Tm represents the melting point of the film (°C.),

T1 represents the initial temperature for the thermal treatment of the film (°C.), T2 represents the terminal temperature for the thermal treatment of the film (°C.), and t represents time for the thermal treatment (sec.).

1 Claim, No Drawings

PROCESS FOR THE PREPARATION OF BIAXIALLY ORIENTED POLYESTER FILM

FIELD OF THE INVENTION

The present invention relates to a process for the preparation of a biaxially oriented polyester film having an excellent levelling property, by way of controlling thermal treatment conditions of the film.

BACKGROUND OF THE INVENTION

Polyesters, especially polyethylene terephthalates (PET), possess good mechanical properties, e.g., tensile strength, elasticity and impact strength, as well as good chemical stability, heat resistance and electrical insulation property; therefore, they have been widely used in various applications such as capacitors, packaging materials, graphics and magnetic recording media.

For use in such applications, polyester films are generally subjected to successive biaxial extension and thermal treatment processes. The biaxially oriented film treated thermally by a conventional method has a significant disadvantage, in that the film has a poor levelling property due to residual extension and contraction stresses applied during the thermal treatment process. The poor levelling property of the film entails poor appearance, coatability and windability, which causes blurring of prints and also curling of the film when laminated.

Therefore, numerous attempts have been made to ameliorate such problems. For example, Japanese Patent Publication No. 72- 3196 discloses a process for treating the portion having poor levelling property using a separate thermal relaxation apparatus. However, this method has some disadvantages, e.g., the relaxation apparatus is not easily adapted to an existing system, and the difficulty in continuous monitoring and mending defective portions when it is installed in a continuous film production system.

U.S. Pat. No. 4,293,508 teaches a method for minimizing the time needed for longitudinal extension of the film. This method still requires the use of complicate equipments that are difficult to harmonize with the existing film production line.

SUMMARY OF THE INVENTION

It is, therefore, an object of the present invention to provide a process for conveniently preparing a biaxially oriented polyester film having an excellent levelling property, by way of controlling thermal treatment conditions of the film.

In accordance with an aspect of the present invention, there is provided a process for preparing a biaxially oriented polyester film which comprises: (a) melt-extruding and extending biaxially a polyester resin to shape it into a film; (b) treating the film thermally under a condition that formulac (1), (2) and (3) are satisfied; and (c) relaxing the film at a temperature range of Tm-60° C. to Tm-140° C. during the step (b):

$$Tm\text{-}60°\ C. < T1 < Tm\text{-}10°\ C. \tag{1}$$

$$50 < T1 - T2 < 100 \tag{2}$$

$$5 < (T1 < T2)/t < 25 \tag{3}$$

wherein:

Tm represents the melting point of the film (° C.),

T1 represents the initial temperature for the thermal treatment of the film (°C.), T2 represents the terminal temperature for the thermal treatment of the film (°C.), and t represents time for the thermal treatment (sec.).

DETAILED DESCRIPTION OF THE INVENTION

A biaxially oriented polyester film is typically prepared by melt-extruding and biaxially extending a polyester resin to shape it into a film, and treating the film thermally for heat-setting.

In accordance with the present invention, a biaxially oriented polyester film having an excellent levelling property can be provided by way of controlling temperatures during the thermal treatment step such that they lie within the ranges specified by the present invention.

A polyester resin suitable for use in the present invention may be prepared by polycondensation of an acid component, such as a dialkyl ester of an aromatic dicarboxylic acid with a diol component, such as an alkylene glycol.

Representatives of the dialkyl ester of aromatic dicarboxylic acid include: dialkyl esters of terephthalic acid, isophthalic acid, naphthalene dicarboxylic acid, cyclohexane dicarboxylic acid, diphenoxyethane dicarboxylic acid, diphenyl dicarboxylic acid, diphenylether dicarboxylic acid, anthracene dicarboxylic acid and $\alpha,\beta$-bis(2-chlorophenoxy)ethane-4,4'-dicarboxylic acid; and, among these, dimethyl terephthalate is most preferred.

Exemplary alkylene glycol are ethylene glycol, trimethylene glycol, tetramethylene glycol, pentamethylene glycol, hexamethylene glycol and hexylene glycol. Among these, ethylene glycol is most preferred.

The polyester resin of the present invention may comprise additives, e.g., antioxidant, UV absorbent, thermal stabilizer, crystallization accelerator, colorant, nucleating agent, lubricant, anti-blocking agent and the like, in amounts which would not deteriorate the effectiveness of the present invention.

Further, in order to impart good winding and optical properties to the film, the polyester resin may comprise additional inert inorganic or organic particles which are insoluble in the polyester resin. These inert particles may be employed in amounts which would not affect the effectiveness of the present invention.

Representatives of the inorganic particles include: oxides or other inorganic salts of a metal selected from Group II, III or IV of Periodic Table of Element, e.g., synthetic or natural calcium carbonate, wet or dry silica, calcium phosphate, magnesium carbonate, talc, alumina, sodium fluoride, titanium oxide, mica, aluminum hydroxide, calcium terephthalate and the like.

Organic particles suitable for use in the present invention include: particles of a crosslinked polymer, elastomer or fluorine-containing polymer; and, among these, particles of a crosslinked polystyrene and fluorine-containing polymer are most preferred.

The inert particles may be added to the polyester resin at any time before terminating the polycondensation of raw materials, and they are preferably added immediately after the transesterification step, or at the beginning of the polycondensation step.

The biaxially oriented polyester film of the present invention may be obtained as follows: a polyester resin prepared by a conventional method is melt-extruded into an amorphous cast sheet by the T-die method well known in the art. The sheet is passed through rollers, which are maintained at a temperature ranging from $T_g+10°$ to $T_g+50°$ C. ($T_g$: glass transition temperature of the polyester resin) and are rotated at different speeds, to extend the resin in the longitudinal (film proceeding) direction in a draw ratio of 2.0 to 5.0, and then, cooled to room temperature, thus providing a monoaxially oriented film. The monoaxially oriented film is transported to a tenter, where the film is extended in both longitudinal and traverse directions at a temperature ranging from $T_g'+10$ to $T_g'+50°$ C. ($T_g'$: glass transition temperature of the monoaxially oriented polyester film) in a draw ratio of 3.0 to 5.0, thus providing a biaxially oriented film.

The film so obtained is then subjected to a thermal treatment process, thereby to impart dimension stability to the film and to control its crystal structure.

In accordance with the present invention, the thermal treatment of the film is carried out under a condition that formulae (1), (2) and (3) are satisfied, wherein the film was relaxed, by partially releasing the tensional stress applied to the film, at a temperature range of Tm-60° C. to Tm-140° C.:

$$Tm\text{-}60°\ C.<T1<Tm\text{-}10°\ C. \qquad (1)$$

$$50<T1-T2<100 \qquad (2)$$

$$5<(T1<T2)/t<25 \qquad (3)$$

wherein:

Tm represents the melting point of the film (°C.),

T1 represents the initial temperature for the thermal treatment of the film (°C.), T2 represents the terminal temperature for the thermal treatment of the film (°C.), and t represents time for the thermal treatment (sec.).

When the initial temperature of the thermal treatment step, T1, is equal to or below Tm-60° C., the dimension stability of the film deteriorates; when it is equal to or higher than Tm-10° C., it becomes difficult to adjust the levelling property of the film.

Further, when the difference between the initial and terminal temperatures of the thermal treatment, T1-T2, is equal to or less than 50° C., the levelling property of the film is not easily controlled and, therefore, becomes poor. When the difference is equal to or greater than 100° C., temperature control in the tenter is difficult.

Even if the formulae (1) and (2) are satisfied in accordance with the above requirements, the levelling property and productivity of the film is lowered if formula (3) is not met.

In the present invention, relaxation of the film is carried out at a temperature range of Tm-60° C. to Tm-140° C. during the thermal treatment process. Any violation of this temperature requirement may make it difficult to control the levelling property and dimension stability of the film.

In preparing the polyester film in accordance with the present invention, conditions for melt-extrusion, casting, and longitudinal and traverse direction extension may be suitably determined by persons skilled in the art.

The following Examples are intended to illustrate the present invention more specifically, without limiting the scope of the invention.

In the Examples and Comparative Examples, the levelling property of the polyester film was evaluated in accordance with the following method: A thermally treated 1 m (length)×1 m (width) film was spread over a black, plane plate and pressed for 30 minutes in order to remove air between the film and the plate. The film was then observed visually, and the percentage of uneven surface area to the total surface area of the film was determined. The levelling property of the film was classified as follows:

A: When the percentage is less than 5%

B: When the percentage is between 5% and 10%

C: When the percentage is between 10% and 30%

D: When the percentage is between 30% and 50%

E: When the percentage is greater than 50%

EXAMPLE 1

Polyethylene terephthalate (PET) chips were melt-extruded through a T-die and quenched over a cooling drum to give a PET sheet. The sheet was extended in longitudinal direction by rollers at 95° C. in a draw ratio of 3.5, to give a monoaxially oriented film, which was transferred to a tenter and extended at 120° C. in traverse direction in a draw ratio of 3.5, yielding give a biaxially oriented PET film. The film was then treated thermally in a temperature section ranging from 220° C. to 140° C. for 10 seconds. During the thermal treatment, the film was relaxed by releasing the tensional stress applied to film at a relaxation rate of 1 to 5% when the temperature was within the range of 190° C. to 140° C.

The levelling property of the PET film thus prepared was evaluated in accordance with the above-mentioned method, and the results are shown in Table I.

COMPARATIVE EXAMPLES 1 to 6

The procedure of Example 1 above was repeated, except that the conditions of the thermal treatment and relaxation steps were varied as shown in Table I.

The levelling properties of the PEN films thus obtained were measured, and the results are shown in Table I.

TABLE I

| | T1 (°C.) | T2 (°C.) | T1−T2 (°C.) | t (sec) | T1−T2 /t(°C./ sec) | Relaxation Temp. (°C.) | Levelling Property |
|---|---|---|---|---|---|---|---|
| Ex. 1 | 220 | 140 | 80 | 10 | 8.0 | 190–140 | A |
| Com. Ex. 1 | 200 | 160 | 40 | 10 | 4.0 | 190–140 | D |
| Com. Ex. 2 | 230 | 80 | 150 | 10 | 15.0 | 190–140 | C |
| Com. Ex. 3 | 230 | 130 | 100 | 3 | 33.3 | 190–140 | C |
| Com. Ex. 4 | 230 | 130 | 100 | 30 | 3.3 | 190–140 | C |
| Com. Ex. 5 | 220 | 140 | 80 | 10 | 8.0 | 200–180 | D |
| Com. Ex. 6 | 220 | 140 | 80 | 10 | 8.0 | 160–80 | D |

As can be seen from Table I, the biaxially oriented polyester film prepared in Example 1 in accordance with the inventive method has an excellent levelling property, which presents a sharp contrast to the inferior levelling properties observed for the films prepared according to procedures outside the scope of the present invention.

While the invention has been described with respect to the above specific embodiments, it should be recognized that various modifications and changes may be made within the scope of the invention as defined by the claims that follow.

What is claimed is:

1. A process for preparing a biaxially oriented polyester film which comprises: (a) melt-extruding and extending biaxially a polyester resin to shape it into a film; (b) treating the film thermally under a condition that formulae (1), (2) and (3) are satisfied; and (c) relaxing the film at a temperature range of Tm-60° C. to Tm-140° C. during the step (b):

$$Tm\text{-}60° C. < T1 < Tm\text{-}10° C. \tag{1}$$

$$50 < T1-T2 < 100 \tag{2}$$

$$5 < (T1 < T2)/t < 25 \tag{3}$$

wherein:

Tm represents the melting point of the film (°C.),

T1 represents the initial temperature for the thermal treatment of the film (°C.), T2 represents the terminal temperature for the thermal treatment of the film (°C.), and t represents time for the thermal treatment (sec.).

* * * * *